United States Patent
Carreras et al.

(10) Patent No.: US 11,270,696 B2
(45) Date of Patent: *Mar. 8, 2022

(54) AUDIO DEVICE WITH WAKEUP WORD DETECTION

(71) Applicant: Bose Corporation, Framingham, MA (US)

(72) Inventors: Ricardo Carreras, Southborough, MA (US); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/458,537

(22) Filed: Jul. 1, 2019

(65) Prior Publication Data

US 2019/0325874 A1 Oct. 24, 2019

Related U.S. Application Data

(63) Continuation of application No. 15/627,905, filed on Jun. 20, 2017, now Pat. No. 10,789,949.

(51) Int. Cl.
| | |
|---|---|
| *G10L 15/16* | (2006.01) |
| *G10L 15/20* | (2006.01) |
| *H04R 1/08* | (2006.01) |
| *G10L 15/22* | (2006.01) |
| *G10L 25/78* | (2013.01) |
| *G10L 21/0216* | (2013.01) |
| *H04M 9/08* | (2006.01) |

(Continued)

(52) U.S. Cl.
CPC .............. *G10L 15/22* (2013.01); *G10L 15/20* (2013.01); *G10L 21/0216* (2013.01); *G10L 25/78* (2013.01); *H04M 9/082* (2013.01); *G10L 2015/088* (2013.01); *G10L 2015/223* (2013.01); *G10L 2021/02082* (2013.01); *G10L 2021/02166* (2013.01)

(58) Field of Classification Search
None
See application file for complete search history.

(56) References Cited

U.S. PATENT DOCUMENTS

| | | | | |
|---|---|---|---|---|
| 8,392,184 | B2* | 3/2013 | Buck | G10L 21/0208 704/233 |
| 9,530,407 | B2* | 12/2016 | Katuri | G10L 15/20 |
| 9,734,822 | B1* | 8/2017 | Sundaram | G10L 17/22 |

(Continued)

OTHER PUBLICATIONS

Adiloğlu, Kamil, et al. "A binaural steering beamformer system for enhancing a moving speech source." Trends in hearing 19 (2015): 2331216515618903. (Year: 2015).*

(Continued)

*Primary Examiner* — Seong-Ah A Shin
(74) *Attorney, Agent, or Firm* — Brian M. Dingman; Dingman IP Law, PC

(57) ABSTRACT

An audio device with at least one microphone adapted to receive sound from a sound field and create an output, and a processing system that is responsive to the output of the microphone. The processing system is configured to use a signal processing algorithm to detect a wakeup word, and modify the signal processing algorithm that is used to detect the wakeup word if the sound field changes.

20 Claims, 5 Drawing Sheets

(51) Int. Cl.
*G10L 15/08* (2006.01)
*G10L 21/0208* (2013.01)

(56) References Cited

U.S. PATENT DOCUMENTS

| | | | | |
|---|---|---|---|---|
| 9,843,861 | B1* | 12/2017 | Termeulen | G10L 21/0208 |
| 9,973,849 | B1* | 5/2018 | Zhang | H04R 3/005 |
| 10,134,425 | B1* | 11/2018 | Johnson, Jr. | G10L 15/05 |
| 10,157,611 | B1* | 12/2018 | Wolff | G10L 15/14 |
| 10,237,647 | B1* | 3/2019 | Chhetri | H04R 1/406 |
| 10,304,475 | B1* | 5/2019 | Wang | G01S 3/80 |
| 10,360,876 | B1* | 7/2019 | Rahman | G06F 3/1423 |
| 2003/0055535 | A1* | 3/2003 | Voeller | G10L 15/26 700/279 |
| 2010/0014690 | A1* | 1/2010 | Wolff | H04R 3/005 381/92 |
| 2010/0183178 | A1* | 7/2010 | Kellermann | H04R 25/552 381/317 |
| 2010/0246851 | A1* | 9/2010 | Buck | G10L 21/0208 381/94.1 |
| 2012/0093338 | A1* | 4/2012 | Levi | H04R 3/005 381/92 |
| 2012/0114138 | A1* | 5/2012 | Hyun | H04R 3/005 381/92 |
| 2013/0082875 | A1* | 4/2013 | Sorensen | H04R 1/406 342/368 |
| 2013/0117014 | A1* | 5/2013 | Zhang | G10L 25/90 704/207 |
| 2013/0258813 | A1* | 10/2013 | Herre | H04R 1/40 367/135 |
| 2013/0308790 | A1* | 11/2013 | Claussen | H04R 1/406 381/92 |
| 2013/0315402 | A1* | 11/2013 | Visser | G10L 19/00 381/18 |
| 2014/0093091 | A1* | 4/2014 | Dusan | H04R 1/1083 381/74 |
| 2014/0112487 | A1* | 4/2014 | Laska | H04R 1/406 381/66 |
| 2014/0195247 | A1* | 7/2014 | Parkinson | G10L 15/22 704/275 |
| 2014/0365225 | A1* | 12/2014 | Haiut | G10L 15/22 704/275 |
| 2015/0379992 | A1* | 12/2015 | Lee | G06F 1/3287 704/275 |
| 2016/0014490 | A1* | 1/2016 | Bar Bracha | H04R 3/005 381/92 |
| 2016/0019907 | A1* | 1/2016 | Buck | G10L 15/20 704/226 |
| 2016/0071526 | A1* | 3/2016 | Wingate | G01S 3/802 704/233 |
| 2016/0241974 | A1* | 8/2016 | Jensen | H04R 25/505 |
| 2016/0322045 | A1* | 11/2016 | Hatfield | G10L 25/84 |
| 2017/0076749 | A1* | 3/2017 | Kanevsky | G10L 25/51 |
| 2017/0195815 | A1* | 7/2017 | Christoph | H04R 5/02 |
| 2017/0243586 | A1* | 8/2017 | Civelli | G10L 15/22 |
| 2017/0263267 | A1* | 9/2017 | Dusan | H04R 1/1016 |
| 2018/0068675 | A1* | 3/2018 | Variani | G10L 19/008 |
| 2018/0096696 | A1* | 4/2018 | Mixter | G10L 25/51 |
| 2018/0190290 | A1* | 7/2018 | Campbell | H04L 63/0428 |
| 2018/0197533 | A1* | 7/2018 | Lyon | G10L 15/02 |
| 2018/0226064 | A1* | 8/2018 | Seagriff | G10K 11/17881 |
| 2018/0249246 | A1* | 8/2018 | Kjems | H04R 3/005 |
| 2018/0262849 | A1* | 9/2018 | Farmani | H04R 3/005 |
| 2018/0268808 | A1* | 9/2018 | Song | G10L 15/28 |
| 2018/0350379 | A1* | 12/2018 | Wung | G10L 21/0364 |
| 2020/0045403 | A1* | 2/2020 | Ganeshkumar | H04R 5/033 |
| 2020/0105295 | A1* | 4/2020 | Sereshki | G10L 15/08 |

OTHER PUBLICATIONS

Welker, Daniel P., et al. "Microphone-array hearing aids with binaural output. II. A two-microphone adaptive system." IEEE Transactions on Speech and Audio Processing 5.6 (1997): 543-551. (Year: 1997).*

* cited by examiner

AUDIO DEVICE WITH WAKEUP WORD DETECTION

CROSS-REFERENCE TO RELATED APPLICATION

This application is a continuation of and claims priority to application Ser. No. 15/627,905, filed on Jun. 20, 2017.

BACKGROUND

This disclosure relates to an audio device with a microphone.

Audio devices that use one or more microphones to continuously monitor the sound field for a wakeup word can use signal processing algorithms, such as beamformers, to increase wakeup word detection rates in noisy environments. However, beamforming and other complex signal processing algorithms can use substantial amounts of power. For battery-operated audio devices, the resultant battery drain can become a use limitation.

SUMMARY

All examples and features mentioned below can be combined in any technically possible way.

In one aspect, an audio device includes at least one microphone adapted to receive sound from a sound field and create an output, and a processing system that is responsive to the output of the microphone and is configured to use a signal processing algorithm to detect a wakeup word, and modify the signal processing algorithm that is used to detect the wakeup word if the sound field changes.

Embodiments may include one of the following features, or any combination thereof. The audio device may comprise a plurality of microphones that are configurable into a microphone array. The signal processing algorithm may comprise a beamformer that uses multiple microphone outputs to detect a wakeup word. Modifying the signal processing algorithm that is used to detect the wakeup word if the sound field changes may comprise changing the quantity of microphone outputs used by the beamformer. The processing system may be configured to use more microphones in the beamformer as the sound pressure level of the sound field increases.

Embodiments may include one of the following features, or any combination thereof. The audio device may further comprise an activity detector that is triggered when it detects voice activity in the output of at least one of the microphones. The processing system may be configured to use more microphones in the beamformer if the activity detector trigger rate is above a threshold trigger rate. The processing system may be configured to use more microphones in the beamformer if the activity detector trigger rate is above a threshold rate and the sound pressure level of the sound field is above a threshold level. The processing system may be configured to use fewer microphones in the beamformer if the sound pressure level of the sound field decreases below the threshold level and the activity detector trigger rate is below its threshold rate. The processing system may be configured to use fewer microphones in the beamformer if the sound pressure level of the sound field decreases below the threshold level, the activity detector trigger rate is below its threshold rate, and at least one hysteresis rule is met. The at least one hysteresis rule may comprise at least one of a sound field sound pressure level and a timer.

Embodiments may include one of the following features, or any combination thereof. Modifying the signal processing algorithm that is used to detect the wakeup word if the sound field changes may comprise modifying the complexity of the signal processing algorithm as the sound field changes. The complexity of the signal processing algorithm may be increased if the sound pressure level of the sound field increases. Modifying the complexity of the signal processing algorithm as the sound field changes may comprise applying noise mitigation techniques. Modifying the complexity of the signal processing algorithm as the sound field changes may comprise applying blind source separation.

Embodiments may include one of the following features, or any combination thereof. The audio device may comprise headphones. The headphones may have earcups with an outside and an inside, and at least some of the microphones may be adapted to receive sound outside of an earcup. The processing system may be further configured to enable an automated echo cancelling algorithm when audio is playing through the audio device.

Embodiments may include one of the following features, or any combination thereof. The processing system may comprise a wakeup word detector that is triggered when it detects a candidate wakeup word. The processing system may be configured to use a wakeup word detector trigger to implement a beamformer using multiple microphone outputs. The wakeup word detector may be implemented with a low-power digital signal processor. The low-power digital signal processor may be adapted to be inputted with the output of a single microphone. The low-power digital signal processor may further implement a low-power activity detector that is inputted with the outputs of one or more microphones, and has an output when a voice or an initial voice like pattern is detected in an input. The processing system may be further configured to provide the low-power activity detector output to the wakeup word detector.

Embodiments may include one of the following features, or any combination thereof. The processing system may be further configured to monitor a microphone output to detect an indication of echo. Modifying the signal processing algorithm that is used to detect the wakeup word if the sound field changes may comprise enabling an echo cancelling algorithm after an indication of echo has been detected. The audio device may comprise a plurality of microphones that are configurable into a microphone array, and the signal processing algorithm may comprise a beamformer that uses multiple microphone outputs to detect a wakeup word. Modifying the signal processing algorithm that is used to detect the wakeup word if the sound field changes may comprise changing the quantity of microphone outputs used by the beamformer. The processing system may be configured to use more microphones in the beamformer when the echo conditions are high.

In another aspect, an audio device includes a plurality of microphones that are configurable into a microphone array, where the microphones are adapted to receive sound from a sound field and create outputs, an activity detector that is triggered when it detects voice activity in the output of at least one of the microphones, and a processing system that is responsive to the microphones and the activity detector, and is configured to use the output of at least one of the microphones to detect a wakeup word and if the sound field changes or the activity detector trigger rate is above a threshold trigger rate, the processing system is further configured to: apply a signal processing algorithm to the output of at least one of the microphones or change the quantity of microphone outputs used to detect the wakeup word.

In another aspect, an audio device includes at least one microphone adapted to receive sound from a sound field and create an output, and a processing system that is responsive to the output of the microphone and is configured to monitor a microphone output to detect an indication of echo, use a signal processing algorithm to detect a wakeup word, and modify the signal processing algorithm that is used to detect the wakeup word if the sound field changes or an indication of echo has been detected.

DETAILED DESCRIPTION

Figure 1:
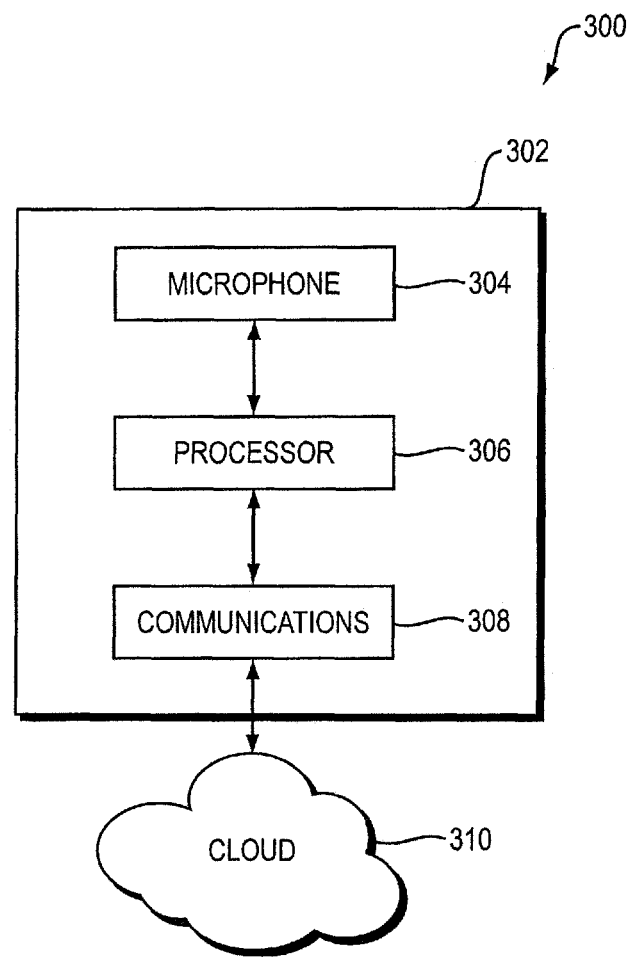
FIG. 1 is a schematic block diagram of an audio device with wakeup word detection.

For devices with voice-controlled user interfaces (e.g., to activate a virtual personal assistant (VPA)), the device has to be constantly listening for the proper cue. In some such devices, a special word or phrase, which is sometimes called a "wakeup word," is used to activate the speech-recognition features of the device. In some examples, the device utilizes one or more microphones to constantly listen for a wakeup word. The microphones and processors used to detect a wakeup word use power. In battery-operated devices, power use can shorten battery life and thus negatively impact the user experience. However, devices need to accurately detect wakeup words or they don't function properly (e.g., there may be false positives, where a device thinks a wakeup word has been spoken when it has not, or there may be false negatives, where a device misses detecting a wakeup word that has been spoken), which can be problematic and annoying for the user.

The present audio device with wakeup word detection includes one or more microphones. When the device has multiple microphones, the microphones may be configurable into a microphone array. The microphones receive sound from a sound field, which is typically from the area surrounding the user. The user may be the wearer of headphones or a user of a portable speaker that comprises the subject audio device, as two non-limiting examples. The audio device includes a processing system that is responsive to the microphones. The processing system is configured to use a signal processing algorithm to detect a wakeup word. If the sound field changes (e.g., due to increased sound pressure level, as may result from increased background noise) and/or the processor detects a high trigger rate of a voice activity detector (VAD) within the audio device, the processing system is configured to modify the signal processing algorithm that is used to detect the wakeup word. In one non-limiting example, increased noise in the sound field may indicate additional microphones should be used to detect the wakeup word, while a high trigger rate of a VAD may indicate high voice activity in the sound field, which also may mean additional microphones should be used to detect the wakeup word.

In quiet environments, a wakeup word can typically be successfully detected with a single microphone. However, in noisy environments, particularly in situations when there are multiple people speaking, wakeup word detection is improved when two (or more) microphones are arrayed as a beamformer optimized to pick up the user's voice, and used to feed the wakeup word detector. The processing system can use algorithms other than beamforming to improve wakeup word detection, for example, blind source separation and adaptive noise mitigation. Beamforming and other algorithms that work well in the presence of noise can require more power to implement as compared to processing the output of a single microphone. Accordingly, in battery-powered audio devices such as some headphones and portable speakers, battery life can be negatively impacted by the need to beamform or use another complex signal processing method for wakeup word detection. Battery life can be extended by changing the number of microphones used in the wakeup word detection task, or using a simpler algorithm. In one example, fewer (e.g., one) microphones can be used when the environment is quiet, and more (e.g., more than one) microphones can be beamformed when the environment becomes noisy. In one non-limiting example, the number of microphones used in the beamformer can progressively increase as the environmental noise increases, and/or the frequency of false wakeup word detections is too great. Then, as the noise decreases and/or the frequency of false wakeup word detections decreases, the number of microphones used to detect the wakeup word can decrease back to one, either in one step, or in multiple steps of progressively fewer microphones.

Similarly, in other examples, other more complex signal processing techniques (e.g., blind source separation, adaptive noise mitigation, echo cancellation, etc.) can be applied to one or more microphones when the environment becomes noisy and/or the frequency of false wakeup word detections is too great. The signal processing techniques that are applied can progressively become more robust in detecting a wakeup word as the environmental noise increases and/or the frequency of false wakeup word detections is too great (at a cost of battery power). Then, as the noise decreases and/or the frequency of false wakeup word detections decreases, the signal processing techniques that are applied can become less robust, but more favorable from a battery usage perspective, either in one step, or in multiple steps.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

FIG. 1 is a schematic block diagram of an audio device 300 with wakeup word detection. Audio device 300 includes a microphone 304 that is situated such that it is able to detect sound from a sound field in the proximity of device 300. The sound field typically includes both human voices and noise. Processor 306 receives the microphone output and uses one or more signal processing algorithms to detect a wakeup word in the received sound. Communications module 308 is able to send and receive in a manner known in the field. Communication can occur to and from cloud 310, and/or to and from another function or device.

Processor 306 is arranged to implement at least one signal processing algorithm that can be used to detect a wakeup word in the microphone output. In order to accurately detect wakeup words in the presence of noise, processor 306 can be enabled to modify the signal processing algorithm that is used to detect the wakeup word if the sound field changes, for example if there is more noise or more people are talking. There are a number of known signal processing methods that are able to facilitate detection of voice signals and rejection of noise. In general, more complex signal processing algorithms that are better at detecting voice in the presence of noise tend to require additional processing and thus tend to use more power than simpler techniques.

This disclosure contemplates the use of one or more such signal processing algorithms for wakeup word detection. The algorithms can be used independently or in combination with each other. One such algorithm, discussed in more detail below, is beamforming. Beamforming is a signal processing technique that uses an array of spaced microphones for directional signal reception. Beamforming can thus be used to better detect a voice in the presence of noise. Other signal processing algorithms include blind source separation and adaptive noise mitigation. Blind source separation involves the separation of a set of signals from a set of mixed signals. Blind source separation typically involves the use of a plurality of spaced microphones to detect the mixed signal, and processing in the frequency domain. In the present disclosure, blind source separation can help to separate a voice signal from mixed voice and noise signals. Adaptive noise mitigation methods are able to adaptively remove frequency bands in which noise exists, in order to mitigate the noise signal and thus strengthen the voice signal. Adaptive noise mitigation techniques can be used with a single microphone output, or with the outputs of multiple microphones.

In the present disclosure, different signal processing techniques can be used to improve wakeup word detection, and such techniques can be used with one microphone, or more than one microphone. For example, a simple technique and a single microphone can be used when there is little noise. More complex techniques and a single microphone can be used as wakeup word detection becomes more difficult, or the same technique but multiple microphones can be used as wakeup word detection becomes more difficult. The processor could cycle through different signal processing techniques and/or employ more microphones, in order to achieve a desirable level of wakeup word detection success.

Figure 2:
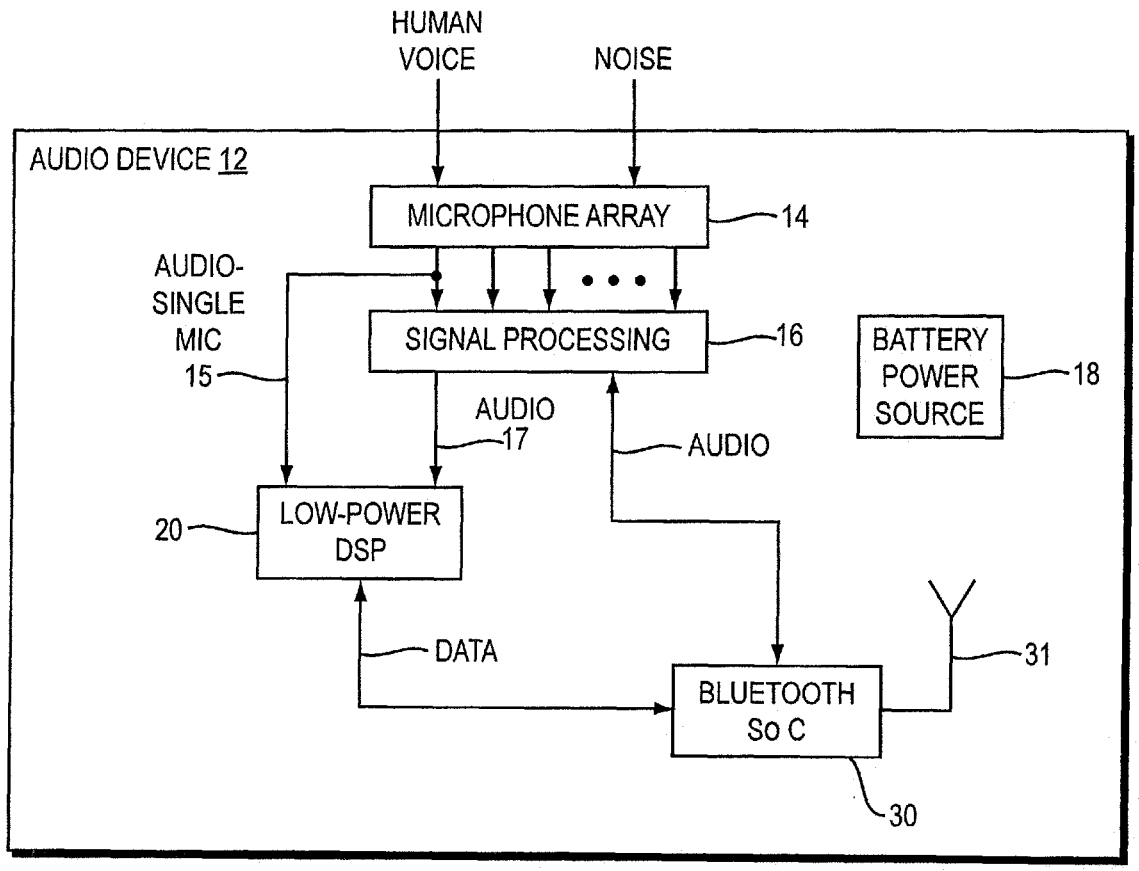
FIG. 2 is a schematic block diagram of an audio device with wakeup word detection.
Figure 2:
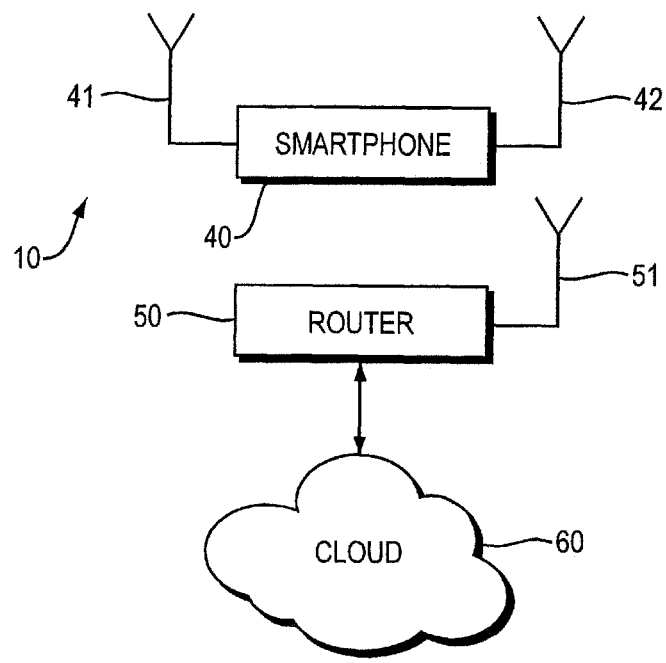

FIG. 2 is a schematic block diagram of an audio device 12, with wakeup word detection. Audio device 12 includes a microphone array 14 that includes one or more microphones. The microphones are situated such that they are able to detect sound from a sound field in the proximity of device 12. The sound field typically includes both human voices and noise. Device 12 may also have one or more electro-acoustic transducers (not shown) so that it can also be used to create sound. Device 12 includes a power source 18; in this non-limiting example, the power source is a battery power source. Many audio devices will have other components or functionality that is not directly related to the present disclosure and which are not shown in the drawings, including additional processing, and a user interface, for example. Examples of audio devices include headphones, headsets, smart-speakers, and wireless speakers. In the description that follows audio device 12 will in some cases be described as a wireless, battery-operated headset or headphones, but the disclosure is not limited to such audio devices, as the disclosure may apply to any device that uses one or more microphones to detect a spoken word or phrase.

In one non-limiting example audio device 12 includes signal processing 16. Signal processing 16 alone or together with digital signal processor (DSP) 20 can be used to accomplish some or all of the signal processing algorithms that are used for wakeup word detection as described herein. Signal processing 16 can receive the outputs of all the microphones of array 14 that are in use, as indicated by the series of arrows. In one non-limiting example, signal processing 16 accomplishes a beamformer. Beamformers are known in the art, and are a means of processing the outputs of multiple microphones to create a spatially-directed sound detection. Generally, the use of more microphones allows for greater directivity and thus a greater ability to detect a desired sound (such as the user's voice) in the presence of undesired sounds (such as other voices, and other environmental noise). However, beamforming requires power for multiple microphones and greater processing needs, as compared to sound detection with a single microphone, and no beamforming. Low-power DSP 20 is configured to receive over line 15 the output of a single, non-beamformed microphone. DSP 20 may also receive from signal processing 16 over line 17 the processed (e.g., beamformed) outputs of two or more microphones. When device 12 uses only a single microphone to detect a wakeup word, signal processing 16 can be bypassed, or can simply not be involved in microphone output processing. Audio device 12 also includes Bluetooth system on a chip (SoC) 30 with antenna 31. SoC 30 receives data from DSP 20, and audio signals from signal processing 16. SoC 30 provides for wireless communication capabilities with e.g., an audio source device such as a smartphone, tablet, or other mobile device. Audio device 12 is depicted as in wireless communication (e.g., using Bluetooth®, or another wireless standard) with smartphone 40, which has antenna 41. Smartphone 40 can also be in wireless communication with the cloud 60, typically by use of a data link established using antenna 42, and antenna 51 of router/access point 50.

As described above, a beamformer is but one non-limiting example of a technique that can be applied to the outputs of the microphone array to improve wakeup word detection. Other techniques that can be accomplished by signal processing 16 may include blind source separation, adaptive noise mitigation, AEC, and other signal processing techniques that can improve wakeup word detection, in addition to or in lieu of beamforming. These techniques would be applied prior to the audio signal (the single mic audio signal 15 or the audio signal based on multiple microphones 17) being passed to the DSP 20. Binaural signal processing can help to detect voice in the presence of noise. Binaural voice detection techniques are disclosed in U.S. patent application Ser. No. 15/463,368, entitled "Audio Signal Processing for Noise Reduction," filed on Mar. 20, 2017, the entire disclosure of which is incorporated by reference herein.

Smartphone 40 is not part of the present audio device, but is included in FIG. 2 to establish one of many possible use scenarios of audio device 12. For example, a user may use headphones to enable voice communication with the cloud, for example to conduct internee searches using one or more VPAs (e.g., Ski® provided by Apple Inc. of Cupertino, Calif., Alexa® provided by Amazon Inc. of Seattle, Wash., Google Assistant® provided by Google of Mountain View, Calif., Cortana® provided by Microsoft Corp. of Redmond, Wash., and S Voice® provided by Samsung Electronics of Suwon, South Korea). Audio device 12 (which in this case comprises headphones) is used to detect a wakeup word, for example as a means to begin a voice connection up to the cloud via smartphone 40.

As described herein, environmental noise may impact the ability of audio device 12 to correctly detect a spoken wakeup word. One specific example of noise may include echo conditions, which can occur when a user or wearer of the audio device is listening to music. When echo conditions are present on one or more microphones that are being used for wakeup word detection, the echo can mask the user's speech when a wakeup word is uttered, and lead to problems with wakeup word detection. The audio device 12 can be enabled to detect echo conditions in the outputs of the microphones, and, as needed, modify the signal processing algorithm to be more robust in the presence of the echo conditions. For example, DSP 20 can be enabled to use an acoustic echo cancellation (AEC) function (not shown) when echo is detected. Echo cancellation typically involves first recognizing the originally transmitted signal that reappears, with some delay, in the transmitted or received signal. Once the echo is recognized, it can be removed by subtracting it from the transmitted or received signal. This technique is generally implemented digitally using a DSP or software, although it can be implemented in analog circuits as well.

There may be echo when music is playing in cases where the headphones do not have a perfect seal to a user's ear. Particularly when a user is listening to music at loud volumes, the sound leakage may be picked up by one or more microphones on the headphones. When echo conditions are detected on these microphones, the audio device 12 may have more difficulty detecting a spoken wakeup word, because the echo may mask the user's speech. Thus, when echo conditions are detected, the audio device 12 could switch to more sophisticated wakeup word detection (e.g., enable an AEC function, and/or use additional microphones with AEC enabled). Thus, the echo conditions can be another trigger for moving from a lower power wakeup word detection state to a higher power (but likely more accurate in view of the echo conditions) wakeup word detection state, to deal with situations where echo may interfere with the accurate detection of a wakeup word.

Whenever there is music playing, there may be a concern about echo conditions. Thus, when music is playing (e.g., by monitoring for a Bluetooth® A2DP stream), the processor could cycle through several levels of microphones and use of AEC, depending on the echo conditions detected. For example, when the echo conditions are low wakeup word detection could be done via single microphone, without enabling AEC. When echo conditions are medium, wakeup word detection could be done via a single microphone, with AEC enabled. When echo conditions are high, wakeup word detection could be done via more microphones, with AEC enabled. There could be other levels in between, by adding more microphones, and/or adjusting the signal processing applied to the outputs of the microphones. When there is not music playing, the algorithm could operate as described elsewhere, looking for external noise and/or activity on a low-power activity detector (described below), and increasing to more microphones and/or more complex algorithms, based on the detected conditions.

When music is playing that is leading to echo conditions and there is noise, the audio device should be enabled to distinguish between echo and noise to, for example, decide if AEC should be enabled. Music and noise have different spectral content, so the signal received by the microphone could be analyzed at different frequencies to make a determination if music or noise is present. Or, AEC could be enabled whenever music is playing, as a precaution, and then additional microphones and/or more complex signal processing could be used based on the level of sound pressure sensed at the microphone (which could either be due to echo or noise).

Figure 3:
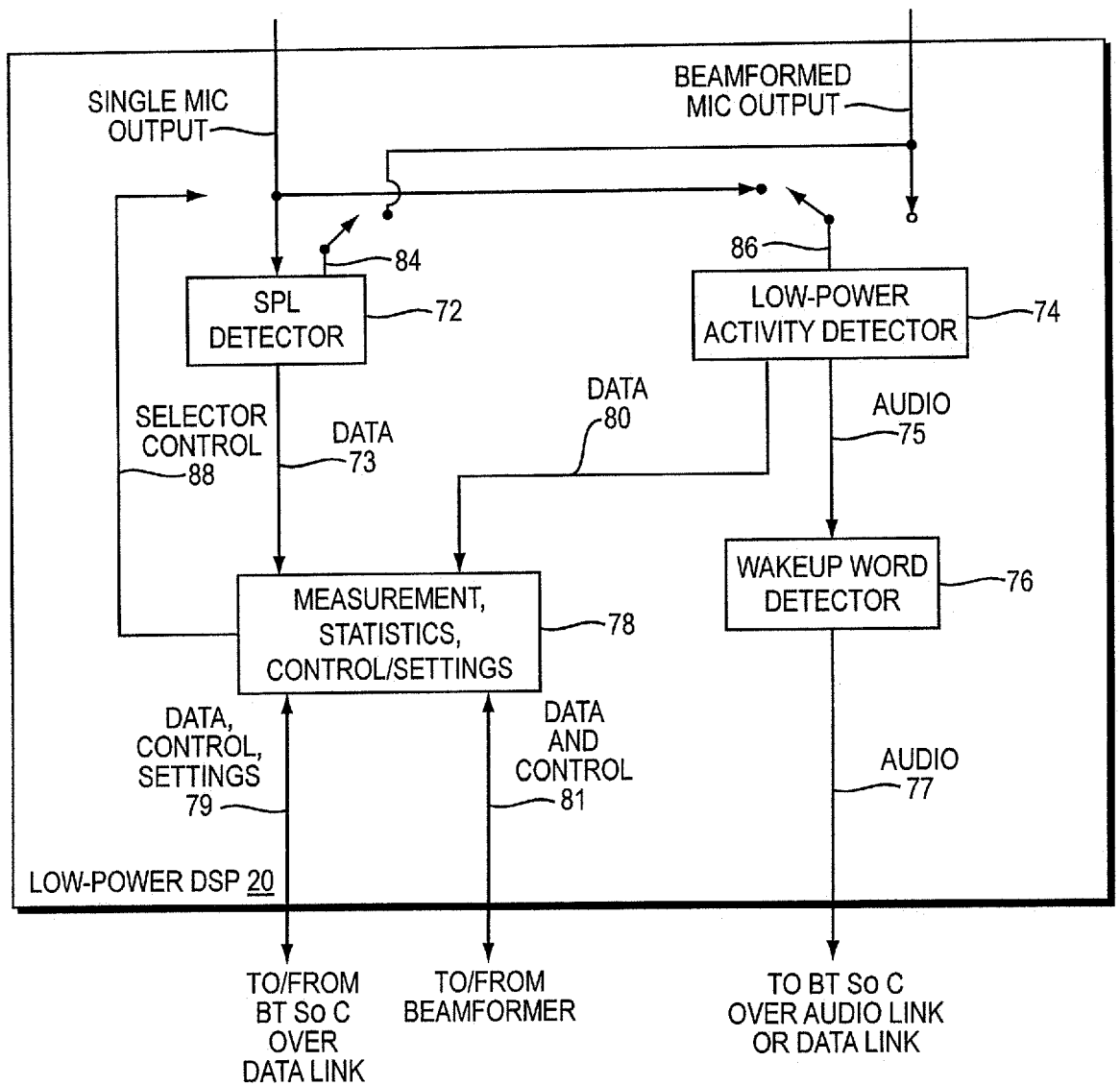
FIG. 3 is a schematic block diagram of the low-power digital signal processor (DSP) of the audio device of FIG. 2.

FIG. 3 is a schematic block diagram of the low-power digital signal processor 20 of audio device 12 of FIG. 2, and includes additional functionality not detailed in FIG. 2. Low-power DSP 20 includes a sound pressure level (SPL) detector 72, a low-power activity detector (LPAD) 74, a wakeup word detector 76, and measurement, statistics, and control/settings functionality 78. Each of these can be accomplished via processing by DSP 20. Each of the three types of detectors are known in the art and so are not fully described herein. SPL detector 72 is one means of detecting the average overall level of sound in the sound field that is detected by the microphone(s) of the array. SPL detector 72 generally monitors an average over seconds of the overall sound field. For example, SPL detector 72 may receive inputs from one or more external microphones to detect the SPL of the surrounding environment. SPL detector 72 may use spectral weighting to assist with wakeup word detection and/or may focus on voice-band energy levels to help differentiate background noise from voice.

LPAD 74 is one means of detecting spectral patterns that may comprise initial utterances of the human voice, or a voice-like spectral pattern, as short as fractions of a second, as compared to diffuse noise and noise from other sources that may vary slowly in time. LPAD 74 creates an output when voice or an initial voice-like pattern is detected in an input. A Voice Activity Detector (VAD) is one well-known type of LPAD that creates an output or trigger each time it detects what may be a voice input. A VAD can comprise self-voice detection algorithms to inhibit false detections due to neighboring voice activities. Self-voice detection algorithms are disclosed in U.S. patent application Ser. No. 15/463,259, entitled "Systems and Methods of Detecting Speech Activity of Headphone User," filed on Mar. 20, 2017, the entire disclosure of which is incorporated by reference herein. The LPAD may also receive inputs from the one or more external microphones to determine if human voice activity is present in the surrounding environment. Since DSP 20 is constantly looking for a wakeup word, any LPAD trigger may (or may not) comprise a wakeup word. Wakeup word detector 76 is configured to receive triggers from LPAD 74 and try to detect the wakeup word in the voice input (which is considered a potential or candidate wakeup word) received from LPAD 74. If wakeup word detector 76 detects a wakeup word, it sends an appropriate signal to the Bluetooth SoC (e.g., to begin Bluetooth communications with smartphone 41).

SPL detector 72 receives the output of a single microphone (which may be further processed via, e.g., AEC or adaptive noise mitigation, as described herein). The beamformed microphone output (or the output from another more complex signal processing algorithm that uses multiple microphones, e.g., blind source separation) can also be selected to be inputted to SPL detector 72, via selector 84 as controlled by control functionality 78 and selector control line 88. Control functionality 78 can also be used to select a single microphone input or the multiple microphone input to LPAD 74, via selector 86. SPL data 73 and LPAD data 80 are provided to measurement, statistics, and control/settings functionality 78, which outputs data, control, and settings information to, and is able to receive from, the Bluetooth® SoC, as indicated by line 79. The algorithm(s) used to detect a wakeup word could be distributed and/or augmented by having additional code running on the Bluetooth® SoC. An output of LPAD 74 is also provided over line 75 to wakeup word (WUW) detector 76, whose output is provided to the Bluetooth® SoC, as indicated by line 77. Functionality 78 is also able to control the beamformer (e.g., to select the number of microphones used in the beamformer) or other signal processing (e.g., AEC, blind source separation, adaptive noise mitigation) over data and control line 81.

In the present audio device, the wakeup word processing (detection) can be based on the input of a single microphone when the environment is relatively quiet. As the environment becomes louder, wakeup word detection can be based on two or more microphones and/or other signal processing techniques can be applied to the microphone output(s) to improve detection of the wakeup word. For example, the microphone outputs can be beamformed, and/or adaptive noise mitigation techniques, blind source separation, AEC, or other signal processing techniques may be applied. In systems with three or more microphones, the number of microphones used can be ramped up in steps. Likewise, as a loud environment begins to quiet, the number of microphones used can be decreased, in one or more steps, in some cases back to a single microphone. In the example shown in FIG. 3, the change in the number of microphones, and/or the use of beamforming or other signal processing techniques, can be based on the frequency with which LPAD 74 is triggered, and/or the sound pressure level detected by SPL detector 72. If the LPAD trigger rate is high, or the SPL is high, or both, then more microphones and/or more advanced signal processing can be used for wakeup word detection. High LPAD trigger rates indicate that the surrounding environment is rich in voice activity, which may mean that additional microphones and/or more advanced signal processing are needed to accurately detect a wakeup word. Similarly, high SPL numbers indicate that the surrounding environment is noisy, which also may mean that additional microphones and/or more advanced signal processing are needed to accurately detect a wakeup word.

Figure 4:
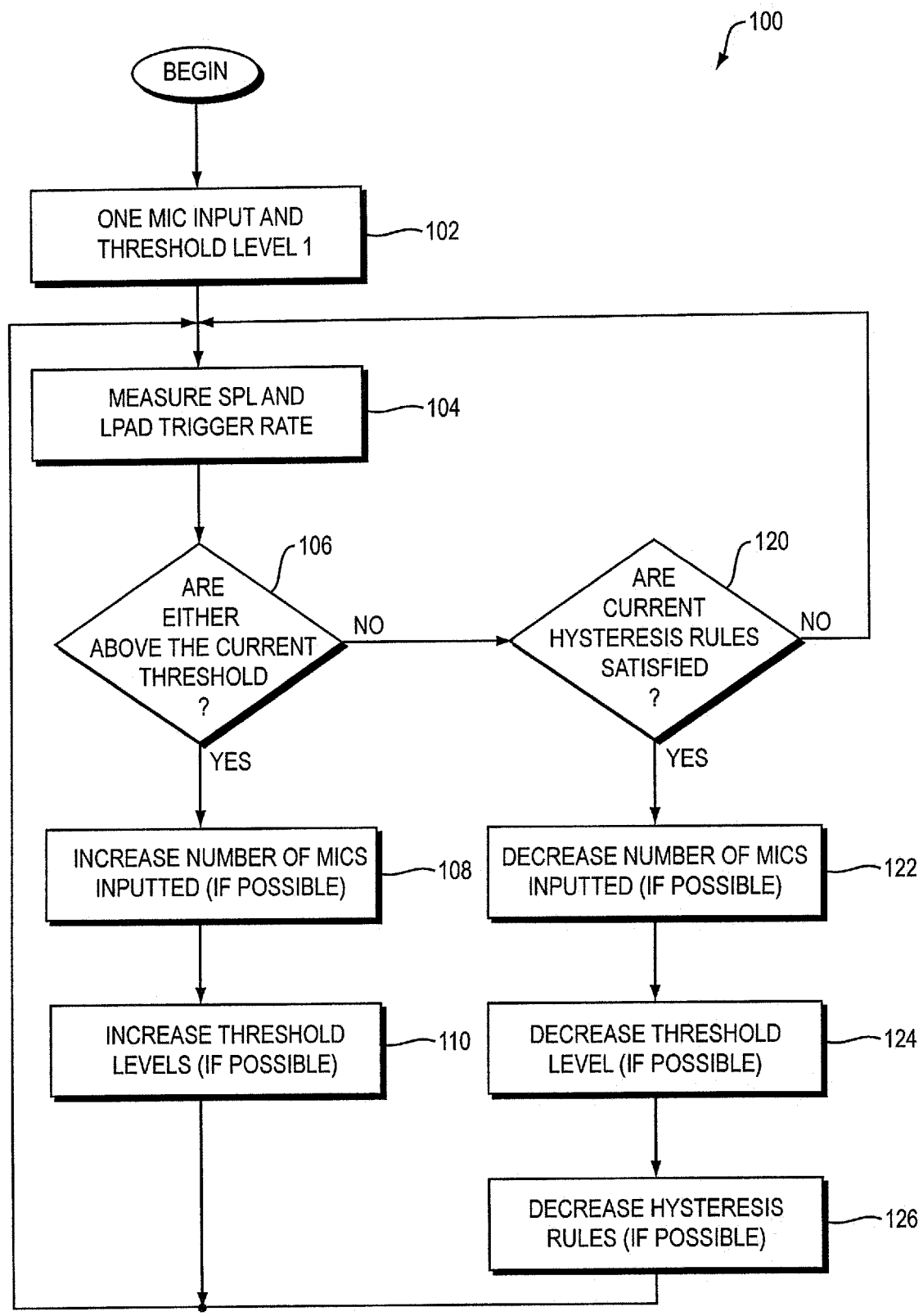
FIG. 4 is a flow chart that details an operation of an audio device with wakeup word detection.

FIG. 4 is a flow chart 100 that details a non-limiting example of an operation of an audio device with wakeup word detection that uses beamforming, such as audio device 12, FIG. 2. At step 102, operation begins with one microphone being used for wakeup word detection. Also, there can be initial threshold levels ("level 1") set for one or both of SPL and LPAD (or, VAD) trigger rate. The threshold(s) indicate the level of noise and/or LPAD trigger rate that would indicate additional microphones (and/or, more complex signal processing algorithms) should be used for wakeup word detection, and can be based on experience, for example. As one non-limiting example, an initial SPL threshold can be about 60-65 dB, and an initial LPAD trigger rate threshold can be about 50%. At step 104, the SPL and the LPAD trigger rate can be measured, as described above. If either are above the respective threshold, step 106, at step 108 the quantity of microphones used in wakeup word detection is increased, if possible; if all the microphones are in current use, obviously, the quantity cannot be increased.

Also, if possible, the threshold levels (for one or preferably both of SPL and LPAD trigger rate) are increased, step 110. For example, the new SPL threshold level could be about 70 dB and the new LPAD trigger rate could be greater than the previous threshold. If the threshold level(s) are at their maxima, the levels are not increased. The increase is typically but not necessarily predetermined, and pre-set in the system. The increase can be accomplished in one step, or over multiple steps. Process 100 contemplates multiple steps.

There are basic use cases that may be helpful in understanding the technology described herein. If the LPAD triggers only once in a while, then the WUW detector only wakes up once in a while, which can be tolerable from a power and accuracy perspective. The other case is when the LPAD is frequently triggering, causing the WUW detector to be running most of the time, which may consume more power than desirable. An issue is how to determine if the second case is "bad," i.e., undesirable? This can be accomplished in one non-limiting example by monitoring both the average noisiness of the environment and how often the LPAD is triggering. If the noisiness is low, then the system disclosed herein monitors the LPAD trigger rate and WUW detector false trigger rate. If the noisiness is high, but the LPAD trigger rate is low, then the system utilizes an increased number of microphones and/or applies more complex signal processing, to avoid missing voice content. If both noisiness is high and the LPAD trigger rate is high, the system utilizes an increased number of microphones and/or applies more complex signal and detects the change in WUW detector false detections.

If the LPAD is triggered frequently but the wakeup word (WUW) trigger rate is subsequently low, this may indicate a challenging acoustic situation that would warrant stepping up the complexity of the voice extraction methodology used. One non-limiting exemplary figure of merit could be: (WUW Trigger Rate)/(LPAD Trigger Rate) less than 30% when the LPAD trigger rate is above once per minute. Also, the metrics used to reduce the complexity of the voice extraction may be different than the metrics used to enter a more complex state. As an example, enter a more complex state when LPAD trigger rate is above one per minute and (WUW trigger rate)/(LPAD trigger rate) is less than 30%, but lower the complexity when the SPL is below 65 dB and the WUW trigger rate has dropped to below 1 per minute.

The process detailed in FIG. 4 also includes optional hysteresis rules, meant to prevent undesired fast cycling between different wakeup word detection states. The hysteresis rules set different thresholds for situations in which the number of microphones and/or complexity of signal processing algorithm used is increasing as compared to when the number of microphones and/or complexity of signal processing algorithm is decreasing. For example, a threshold SPL can be at one level to trigger an increase in the number of microphones and/or complexity of signal processing algorithm used. As the SPL later drops, the number of microphones used and/or complexity of signal processing algorithm should also drop. However, the threshold for a dropping SPL should be a bit less than that for an increasing SPL, so that the system is not overly sensitive to small changes in SPL around the threshold. The same applies for the wakeup word trigger rate threshold. An alternative hysteresis rule uses a timer rather than or in addition to a different level. That is, using the above example, as the SPL drops to the threshold level, the hysteresis rule will be satisfied if the SPL remains at or below the threshold level for at least a predetermined amount of time. Operation then returns to step 104. Note that dynamically changing the hysteresis rules is an optional step; the hysteresis rules could be static if desired.

Steps 104-112 thus will progressively increase the number of microphones used and/or the complexity of the signal processing algorithm used, as the SPL increases and/or the wakeup word detector trigger rate increases.

Steps 120-126 come into play when the SPL and/or the wakeup word detector trigger rate are not reaching the currently set thresholds. If the SPL and LPAD trigger rates are below current thresholds, step 106, then current hysteresis rules are reviewed to see if they have been satisfied, as described above, step 120. If they are satisfied, at step 122 the quantity of microphones used and/or the complexity of the signal processing algorithm used in wakeup word detection is decreased, if possible; if only one microphone is in current use, obviously, the quantity could not be decreased. Also, if possible, the threshold levels (for one or preferably both of the SPL, and LPAD trigger rate) are decreased, step 124. The decrease is typically but not necessarily predetermined and pre-set in the system. At step 126, the hysteresis rules are decreased, if possible. The decreases can be accomplished in one step, or over multiple steps. Process 100 contemplates multiple steps. If the SPL and LPAD trigger rates are below current thresholds, step 106, and current hysteresis rules are not satisfied, step 122, then operation returns to step 104.

One non-limiting example of operation of the subject audio device, which uses three microphones for wakeup word detection, is as follows. In a quiet environment, with noise below a first threshold level potentially in the range of about 65 dB, the device listens for a wakeup word with a single microphone. If the SPL increases above the first threshold, and/or the error rate of the wakeup word detection increases above a first threshold rate (which, in one non-limiting example, is more than one false detection per hour), DSP 20 enables beamformer 16 to begin beamforming using two microphones. If the SPL then increases above a second threshold that is greater than the first threshold (e.g., above 70 dB), and/or the error rate of the wakeup word detection increases above a second threshold rate that is greater than the first threshold rate, DSP 20 enables beamformer 16 to begin beamforming using all three microphones. As the noise decreases and/or the wakeup word detection error rate decreases, the process is reversed until only one microphone is in use. If the device includes hysteresis rules, these are also accounted for, as described above. The system can be scaled to use more than three microphones using the same techniques.

Note that some of the processing involved in the several operations described herein can be off-loaded to the cloud, with information and statistics reported back to the audio device, as necessary. For example, the audio device can decide if a WUW has been detected and trigger a process. The audio device DSP can pass information to the Bluetooth® SoC and on to the cloud. Additional processing can take place in the cloud (i.e., off-site), for example to determine if the WUW detection was correct. If this additional processing indicates too many false positive WUW detections, changes can be triggered in the audio device so as to increase the reliability of the WUW detection.

Also, the signal processing algorithms and the rules used as complexity is increased do not need to be the same as those used as the complexity is decreased. For example, complexity may be increased dramatically (e.g., move from least complex signal processing to most complex signal processing in a single step) if WUW detection becomes problematic, as correct WUW detection is typically more important than battery life. On the other hand, if noise decreases dramatically (e.g., a headphone wearer walks outside from a crowded party), complexity may be decreased in a single step rather than multiple steps.

Figure 5:
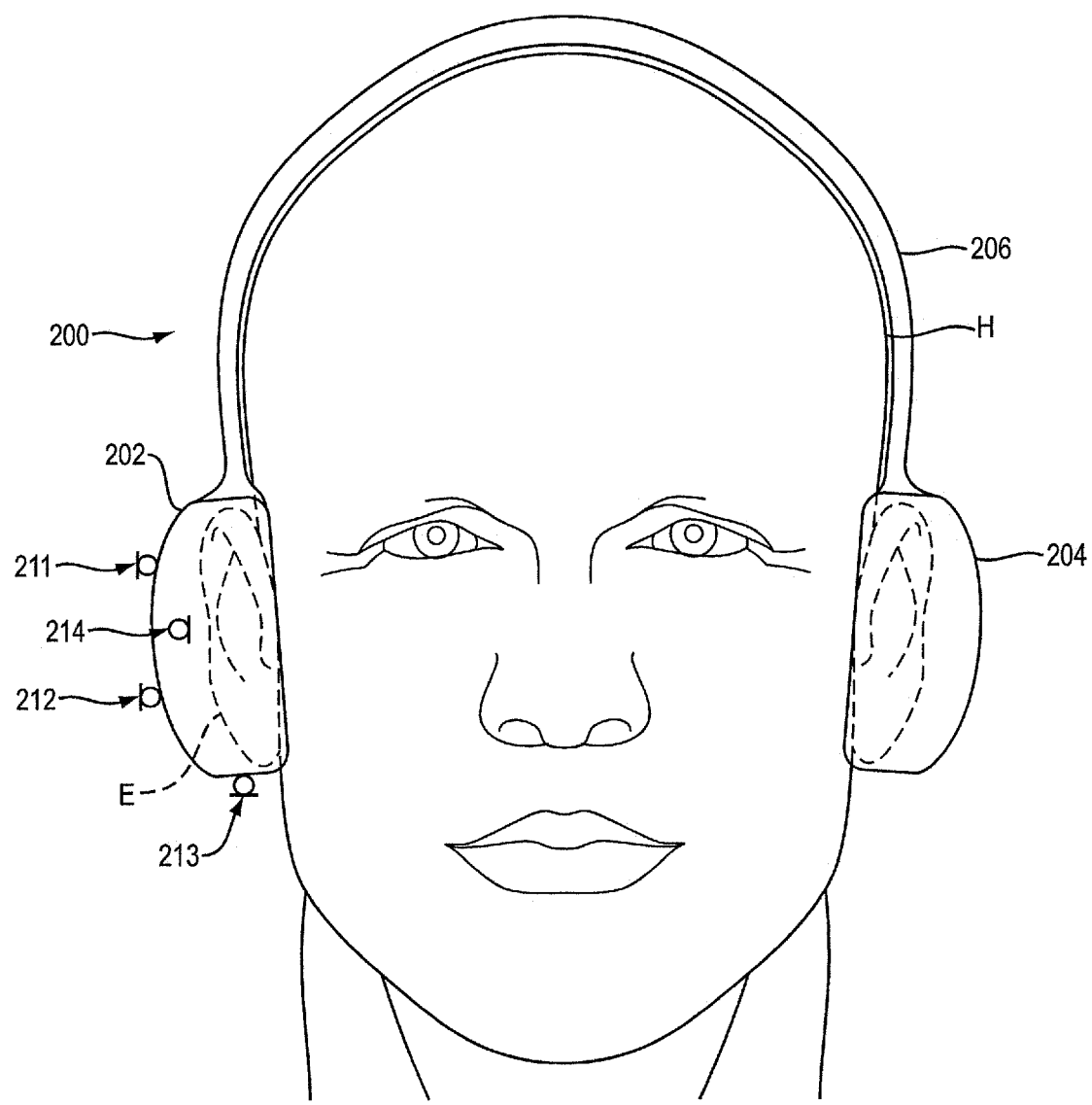
FIG. 5 is a schematic diagram of headphones as an example of the audio device with wakeup word detection.

FIG. 5 is a schematic diagram of headphones 200, which are one non-limiting example of an audio device with wakeup word detection. In the example of FIG. 5, headphones 200 include headband 206, and on-ear or over-ear earcups, 204 and 202. Details relating to earcup 202 are presented here, and would typically exist for both earcups (if the headphones have two earcups). Details are given for only one earcup, simply for the sake of simplicity. Headphones could take on other form factors, including in-ear headphones or earbuds and shoulder or neck-worn audio devices, for example.

Earcup 202 sits over ear E of head H. One or more external microphones are mounted to earcup 202 such that they can detect SPL outside of the earcup. In this non-limiting example, three such microphones 211, 212, and 213, are included. Microphones 211, 212, and 213 can be located at various positions on earcup 202; the positions shown in FIG. 4 are exemplary. Also, there can be but need not be one or more internal microphones inside of the earcup, such as microphone 214, which detects SPL inside of the earcup. Microphones inside an earcup can be used for noise cancellation, as is known in the art. External microphones 211-213 are typically used for wakeup word detection as described herein, and can also be used for noise cancellation or other communications applications. Internal microphone(s) can alternatively or additionally be used for wakeup word detection. In situations where only a single microphone is used, it will typically but not necessarily be the one closest to the mouth, which in this case would be microphone 213. Also, beamforming can sometimes be improved by using one or more microphones on both earcups. Accordingly, for headphones with two earcups, the subject audio device can use microphones from one or both earcups. In situations in which there is substantial noise of some type that impacts the external microphones' ability to detect the user's voice (e.g., if it is windy and all the outside microphones 211-213 are overwhelmed by wind noise), inside microphone 214 can be used to detect voice, as is known in the art.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A wearable audio device, comprising:
a plurality of left microphones coupled to a left side of the wearable audio device and configured to sense sound pressure in a sound field in the proximity of the audio device;
a plurality of right microphones coupled to a right side of the wearable audio device and configured to sense sound pressure in the sound field;
a processing system that is responsive to the outputs of the microphones and is configured to:
use a first signal processing algorithm to detect a wakeup word, wherein the first signal processing algorithm is not a binaural beamforming signal processing algorithm; and
if the sound field changes by an increase in sound pressure level in the sound field, use a second signal processing algorithm that is different than the first signal processing algorithm to detect a wakeup word, wherein the second signal processing algorithm is a binaural beamforming signal processing algorithm that acts on the outputs of the left microphones and the right microphones to detect a wakeup word.

2. The wearable audio device of claim 1, wherein the left microphones are configurable into a left microphone array and the right microphones are configurable into a right microphone array.

3. The wearable audio device of claim 1, further comprising changing the quantity of microphone outputs used by the binaural beamforming signal processing algorithm.

4. The wearable audio device of claim 3, wherein the processing system is configured to use more microphones in the binaural beamforming signal processing algorithm as the sound pressure level of the sound field increases.

5. The wearable audio device of claim 1, further comprising an activity detector that is configured to detect a voice-like spectral pattern in a microphone output and in response create a trigger, wherein the binaural beamforming signal processing algorithm is used in response to the trigger.

6. The wearable audio device of claim 5, further comprising determining a rate at which triggers are created.

7. The wearable audio device of claim 6, wherein the processing system is configured to use more microphones in the binaural beamforming signal processing algorithm if the trigger rate is above a threshold trigger rate.

8. The wearable audio device of claim 6, wherein the processing system is configured to use more microphones in the binaural beamforming signal processing algorithm if the trigger rate is above a threshold rate and the sound pressure level of the sound field is above a threshold level.

9. The wearable audio device of claim 8, wherein the processing system is configured to use fewer microphones in the binaural beamforming signal processing algorithm if the sound pressure level of the sound field decreases below the threshold level and the trigger rate is below its threshold rate.

10. The wearable audio device of claim 8, wherein the processing system is configured to use fewer microphones in the binaural beamforming signal processing algorithm if the sound pressure level of the sound field decreases below the threshold level, the trigger rate is below its threshold rate, and at least one hysteresis rule is met.

11. The wearable audio device of claim 10, wherein the at least one hysteresis rule comprises at least one of a sound field sound pressure level and a timer.

12. The wearable audio device of claim 1, further comprising modifying a complexity of the signal processing algorithm as the sound field changes.

13. The wearable audio device of claim 12, wherein the complexity of the signal processing algorithm is increased if the sound pressure level of the sound field increases.

14. The wearable audio device of claim 12, wherein modifying the complexity of the signal processing algorithm as the sound field changes comprises at least one of: applying noise mitigation techniques and applying blind source separation.

15. The wearable audio device of claim 1, wherein the wearable audio device comprises earcups with an outside and an inside, and wherein at least some of the microphones are adapted to receive sound outside of an earcup.

16. The wearable audio device of claim 1, wherein the processing system comprises a wakeup word detector that is triggered when it detects a candidate wakeup word.

17. The wearable audio device of claim 16, wherein the processing system is configured to use a wakeup word detector trigger to implement the binaural beamforming signal processing algorithm.

18. The wearable audio device of claim 16, wherein the wakeup word detector is implemented with a low-power digital signal processor that is adapted to be inputted with the output of a single microphone.

19. The wearable audio device of claim 18, wherein the low-power digital signal processor is further configured to detect in a microphone output a voice-like spectral pattern and in response create a trigger that is provided to the wakeup word detector.

20. The wearable audio device of claim 1, wherein the processing system is further configured to monitor a microphone output to detect an indication of echo, and wherein the processing system is further configured to enable an echo cancelling algorithm in response to the detection of an indication of echo.

* * * * *